US006968559B2

(12) United States Patent
Tsung-Jung

(10) Patent No.: US 6,968,559 B2
(45) Date of Patent: Nov. 22, 2005

(54) DISK-POSITIONING DEVICE

(75) Inventor: Kuo Tsung-Jung, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 82 days.

(21) Appl. No.: 10/437,857

(22) Filed: May 14, 2003

(65) Prior Publication Data
US 2004/0205789 A1 Oct. 14, 2004

(30) Foreign Application Priority Data
Mar. 5, 2003 (TW) .............................. 92104752 A

(51) Int. Cl.[7] .............................................. G11B 17/04
(52) U.S. Cl. ..................................... 720/623; 720/616
(58) Field of Search ............... 720/616, 620, 720/622, 623

(56) References Cited

U.S. PATENT DOCUMENTS 5,195,077 A * 3/1993 Ishikawa et al. ............ 720/623
5,416,763 A * 5/1995 Ohsaki ........................ 720/623
6,084,838 A * 7/2000 Tanaka et al. ............... 720/620
6,542,453 B1 * 4/2003 Yamada et al. .............. 720/616
6,826,766 B2 * 11/2004 Tuchiya ....................... 720/620
2003/0227856 A1 * 12/2003 Kim et al. ................... 369/77.1

* cited by examiner

Primary Examiner—William J Klimowicz
(74) Attorney, Agent, or Firm—Thomas, Kayden, Horstemeyer & Risley

(57) ABSTRACT

The present disclosure is directed to a disk-positioning device for use in an optical disk device that can receive and position optical disks of different sizes. Embodiments of the device comprise a substrate, a locking rod having a locking extension, a right positioning plate, a left positioning plate, a trigger arm and a sliding element. A gear rack and a spur gear are integrally formed with the left positioning plate and the right positioning plate respectively, and the spur gear and gear rack are in mesh when the optical disk device is in use. Furthermore, two locking notches are integrally formed with the right positioning plate. When the disk having a first size is loaded, the locking pin of the locking rod disengages from one of the two locking notches. When a disk having a second size is loaded, the locking rod maintains its lock with the right positioning plate.

15 Claims, 13 Drawing Sheets

DISK-POSITIONING DEVICE

FIELD OF THE INVENTION

The present invention relates generally to optical disk devices and, more particularly, to disk-positioning devices for use in optical disk devices.

BACKGROUND

Slot-in optical disk drives allow users to conveniently load and unload optical disks. Slot-in optical disk drive can be implemented in various electronic devices, for example, notebook computers and car CD players. Thus, the conventional slot-in disk drive permit easier loading and unloading. Conventional slot-in optical disk drives typically operate on standard 12-cm disks ("12-cm disk"). However, recent developments have led to the use of smaller 8-cm diameter disks ("8-cm disk").

Referring to FIG. 1, the disk 9a having a 12-cm diameter is loaded into the conventional optical disk drive 91 through an opening 92. However, it is impossible for the conventional optical disk drive 91 to discriminate between 12-cm disks and 8-cm disks. Therefore, the conventional optical disk drive 91 uses, as its positioning basis, the standard 12-cm disk. Hence, it may be difficult to properly position the optical disk when smaller 8-cm optical disk is inserted. Even worse, a read failure may occur when the conventional optical disk drive 91 attempts to read the smaller 8-cm optical disk. Furthermore, conventional optical disk drives 91 employ a positioning mechanism that is very complex and includes a lot of parts.

Accordingly, there is a need to develop an optical disk device that can receive and read optical disks of different sizes (e.g., 8-cm disk and 12-cm disk).

SUMMARY

It is an object of the present invention to provide an optical disk device that can receive and position optical disks of different sizes.

It is another object of the present invention to provide a disk-positioning device for use in an optical disk device that accurately receive and position optical disks the user is loading.

The present invention provides an optical disk device having a disk-positioning device adapted to receive and position different types of optical disks. In one embodiment of the present invention, the disk-positioning device comprises a substrate, a locking rod having a locking extension, a right positioning plate, a left positioning plate, a trigger arm and a sliding element. A gear rack and a spur gear are integrally formed with the left positioning plate and the right positioning plate respectively, and the gear rack of the left positioning plate and the spur gear of the right positioning plate are in mesh when the optical disk device is in use. Furthermore, two locking notches are integrally formed with the right positioning plate. When the disk having a first size is loaded, the locking extension of the locking rod disengages from one of the two locking notches. When a disk having a second size is loaded, the locking rod maintains its lock with the right positioning plate.

BRIEF DESCRIPTION OF THE DRAWINGS

The present invention can be fully understood from the following detailed description and preferred embodiment with reference to the accompanying drawings.

DETAILED DESCRIPTION OF THE PREFERRED EMBODIMENTS

The following detailed description is not to be taken in a limiting sense, but is made merely for the purpose of illustrating general principles of embodiments of the invention.

Although the embodiments of the present invention are described below in connection with a slot-in optical disk drive, the present invention can be applied to any optical disk drive including, but not limited to, CD-ROM drives, CD-RW drives, DVD-R/RW drives, COMBO drives, car audio players, external drives, as well as all other optical media recorders and players.

Figure 1:
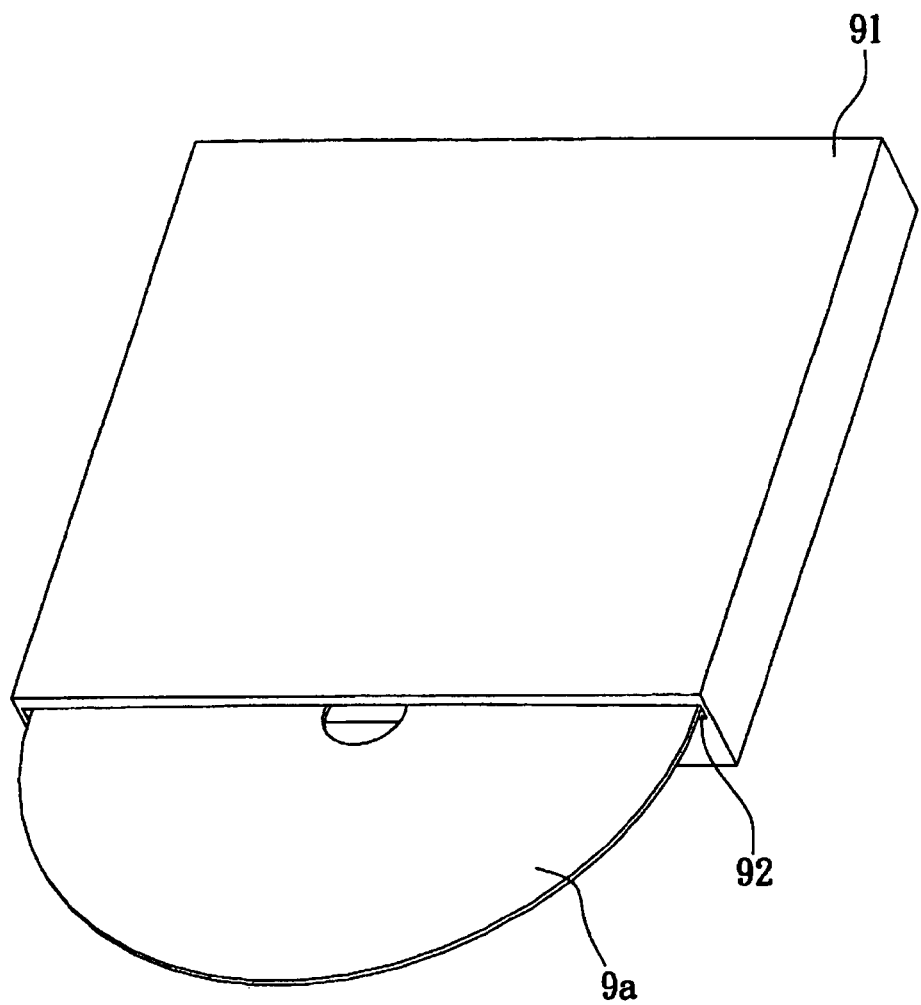
FIG. 1 is a perspective view of a conventional optical disk drive.
Figure 2:
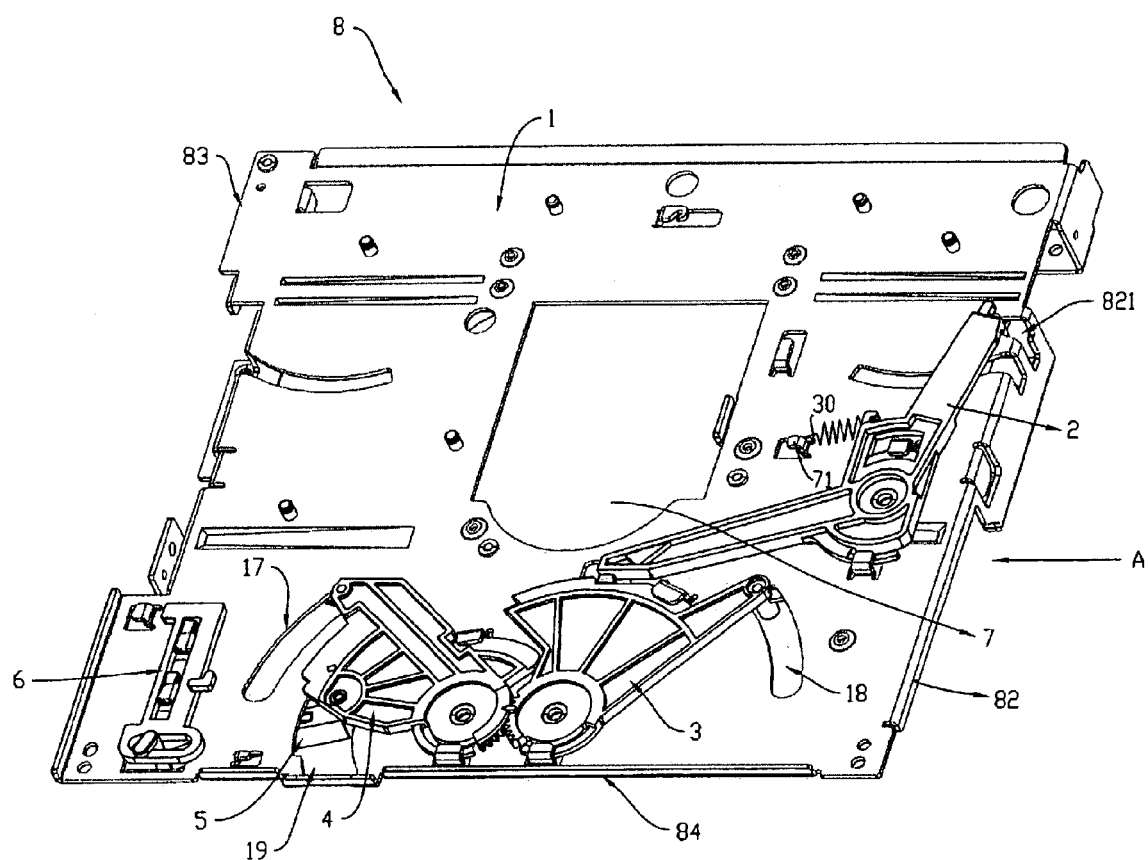
FIG. 2 is a perspective view showing one embodiment of an optical disk device, with a top cover and a bottom cover removed.
Figure 3:
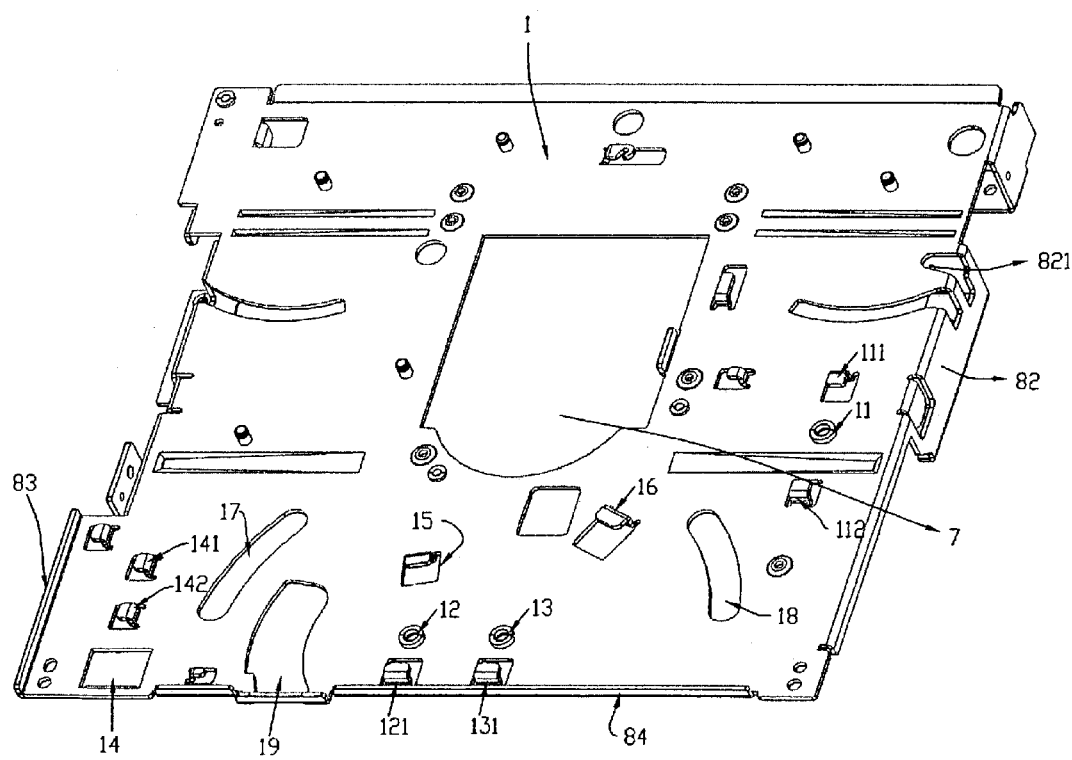
FIG. 3 is a perspective view of a substrate of the optical disk device of FIG. 2.

FIGS. 2 and 3 illustrate a disk-positioning device 8 of an optical disk device according to several embodiments of the present invention. Referring to FIG. 2, the disk-positioning device 8 has a substrate 1, a locking rod 2, a right positioning plate 3, a left positioning plate 4, a trigger arm 5 and a sliding element 6. FIG. 2 illustrates the interconnections of the various components of the disk-positioning device 8 with respect to a substrate 1.

As shown in FIG. 3, the substrate 1 has a central hole 7, a guide groove 821 positioned at a right edge 82, a left guide groove 17 positioned near a left edge 83, a right guide groove 18 positioned near a right edge 82, and a rear curved guide groove 19 provided in close proximity to a rear edge 84. The substrate 1 also has a pivot 11 provided near the right edge 82. Additionally, the substrate 1 has a left positioning pivot 12 and a right positioning pivot 13 provided in close proximity to the rear edge 84. Furthermore, the substrate 1 also has a rear guide groove 14 positioned in close proximity to the rear edge 84, a left restriction hook 15, a right restriction hook 16, two restriction hooks 111, 112 provided near the right edge 82, two rear restriction hooks 141, 142 and a left positioning hook 121, and a right positioning hook 131 provided near the rear edge 84.

Further referring to FIG. 3, the pivot 11 is provided between two restrictions hooks 111 and 112, and also defined near the right edge 82. The left positioning pivot 12 and the right positioning pivot 13 are respectively positioned near the left positioning hook 121 and the right positioning hook 131. The left guide groove 17 is provided between the rear curved guide groove 19 and two rear restriction hooks 141 and 142. Elements numbered by numeral 12, 13, 121, 131, 14, 141, 142, 15, 16, 17 and 18 are positioned near the rear edge 84.

Figure 4:
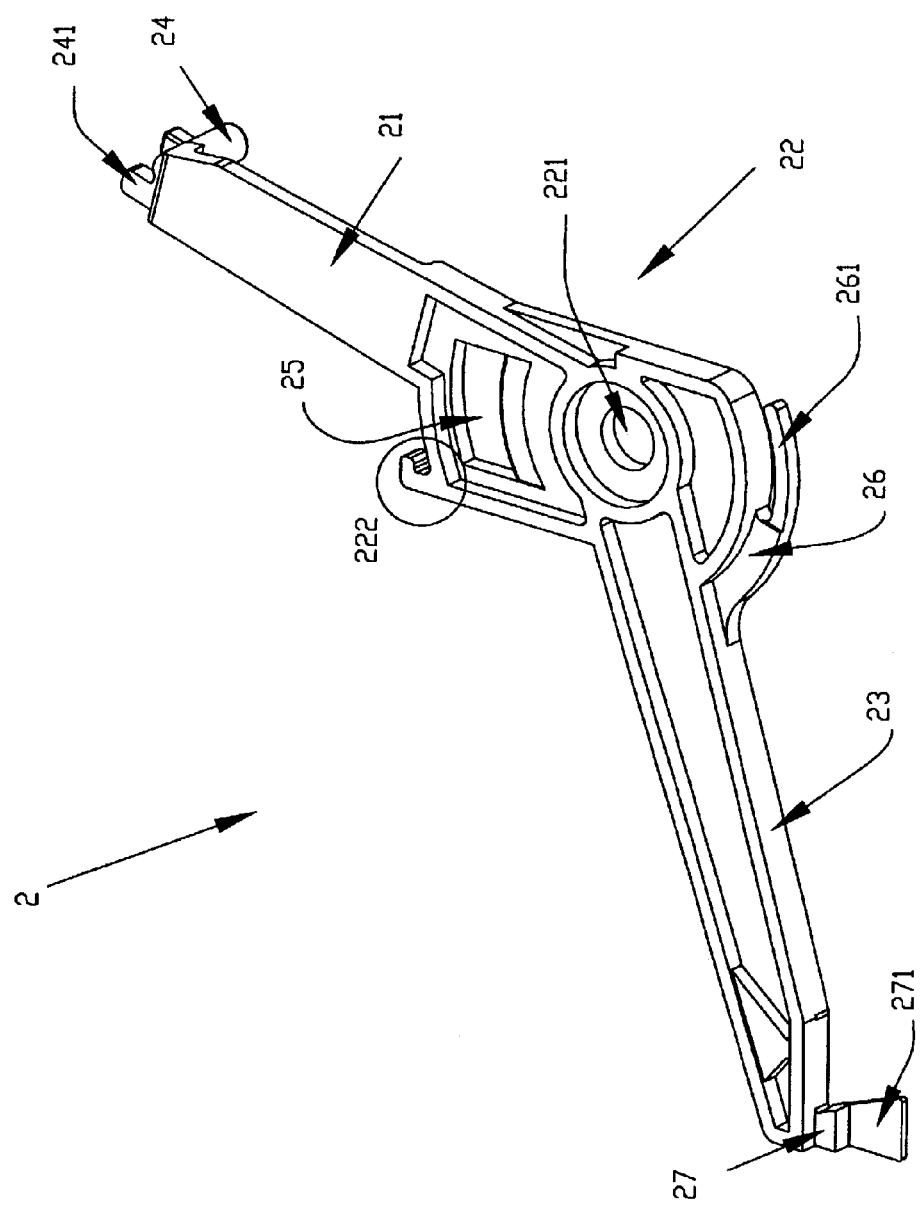
FIG. 4 is a perspective view of a locking rod of the optical disk device of FIG. 2.

Referring to FIGS. 3 and 4, the locking rod 2 has a first segment 21, a bending segment 22 and a second segment 23. The pivot 11 pivotally couples a hole 221 that is provided at the bending segment 22 of the locking rod 2. A locking rod guide pin 24 is provided on a bottom surface of the first segment 21, and the locking rod guide pin 24 is adapted to extend through and travel along the guide groove 821 of the substrate 1. The locking rod 2 carries an extension 241 extending from the first segment 21, and the extension 241 abuts a bottom surface of the substrate 1 during the insertion and ejection of the optical disk. A guide groove 25 is provided in the bending segment 22, and the guide grooves 25 are positioned near the first segment 21. A flange 26 is provided in the bending segment 22 and near the second segment 23, and a curved extension 261 extends from the flange 26. The curved extension 261 is adapted to slide along, and abut, the restriction hook 112 when the optical disk is loaded or unloaded. The guide groove 25 is adapted to receive the restriction hook 111 of the substrate 1. The second segment 23 of the locking rod 2 has a locking pin 27, and a locking extension 271 extends from the locking pin 27. As shown in FIG. 2, an elastic member 30 connects an element hook 222 (positioned near the guide groove 25) and a hook 71 (provided adjacent the central hole 7). The elastic member 30 functions to normally bias the locking rod 2 toward the central hole 7. That is, the elastic member 30 pulls the locking rod 2 inwardly in the direction of arrow A in FIG. 2.

Figure 5A:
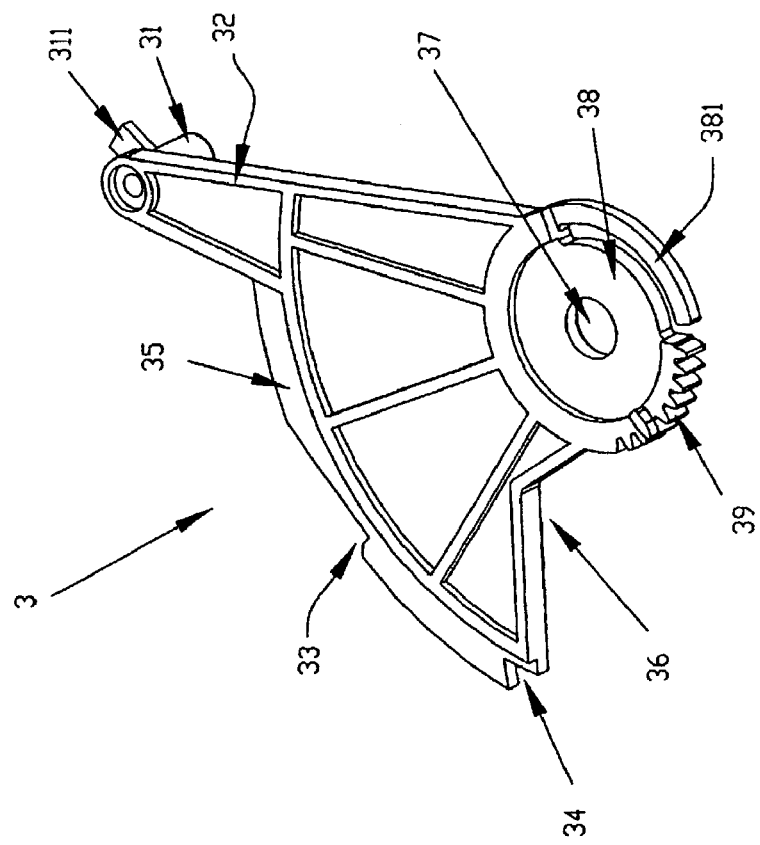
FIG. 5A is a perspective view of a right positioning plate of the optical disk device of FIG. 2.
Figure 5B:
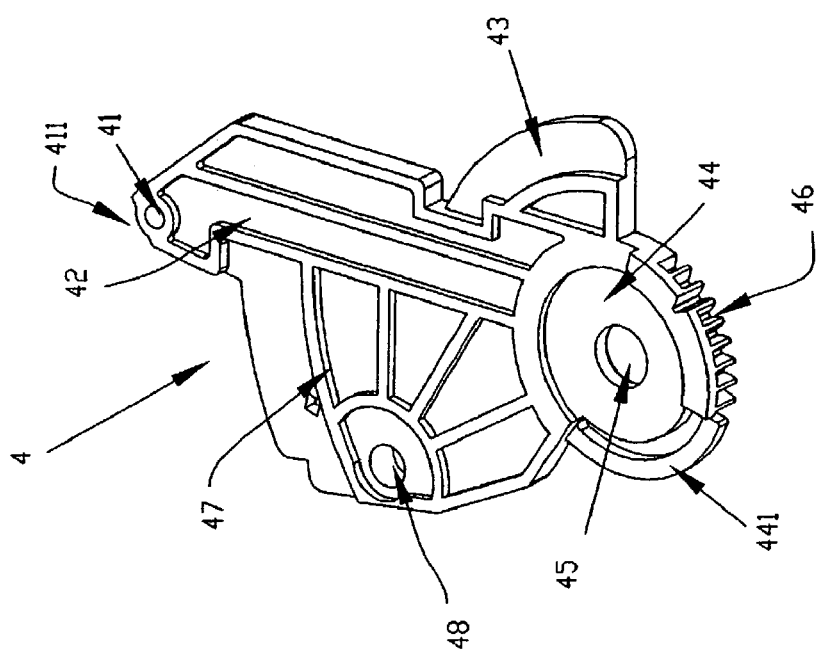
FIG. 5B is a perspective view of a left positioning plate of the optical disk device of FIG. 2.

FIGS. 5A and 5B illustrate the right positioning plate 3 and the left positioning plate 4 of the disk-positioning device 8. As shown in FIG. 5A, the right positioning plate 3 is a generally shell-shaped component, and a right arm 32 of the right positioning plate 3 carries a right guide pin 31 that extends from its bottom surface. The right guide pin 31 is adapted to extend through, and travel within, the right guide groove 18 of the substrate 1. A right projection 311 is provided near the right guide pin 31, and extends from the right arm 32 of the right positioning plate 3. The right projection 311 abuts and slides along the bottom surface of the substrate 1 when the optical disk is loaded and unloaded. A first notch 33 and a second notch 34 are also defined on a right flange 35 of the right positioning plate 3. The right flange 35 generally laterally extends from the right arm 32 to a V-shaped portion 36. The locking pin 27 of the locking rod 2 is adapted to releasably engage with the first notch 33 and the second notch 34 during the insertion and ejection of the optical disk. The right positioning pivot 13 pivotally couples a right positioning hole 37 that is provided at a center of a circular portion 38. A right curved extension 381 extends from the circular portion 38, and the right restriction hook 16 and a right positioning hook 131 are respectively adapted to receive the right flange 35 and the right curved extension 381 of the right positioning plate 3. In addition, a spur gear 39 is defined between the V-shaped portion 36 and the right curved extension 381.

Referring to FIG. 5B, the left positioning plate 4 includes a left guide pin 41 extending from its bottom surface, a left flange 43 and a guide pin 47. The left guide pin 41 is adapted to travel within and extend through the left guide groove 17. A left projection 411 is provided near the left guide pin 41, and extends from a left arm 42 of the left positioning plate 4. The left projection 411 abuts, and slides along, a bottom surface of the left positioning plate 4. The guide pin 47 is provided on, and extends from, the bottom surface of the left positioning plate 4. As shown in FIGS. 2 and 5B, the left positioning pivot 12 pivotally couples a left positioning hole 45 that is defined at a center of a left circular portion 44. A left curved extension 441 extends from the left circular portion 44, and a gear rack 46 is provided at the perimeter of the left circular portion 44. The left flange 43 is positioned adjacent the gear rack 46. The left restriction hook 15 and the left positioning hook 121 are respectively adapted to receive the left flange 43 and the left curved extension 441 of the left positioning plate 4 during the insertion and ejection of the optical disk. In addition, the spur gear 39 and gear rack 46 are in mesh when the optical disk is loaded or unloaded.

Figure 6B:
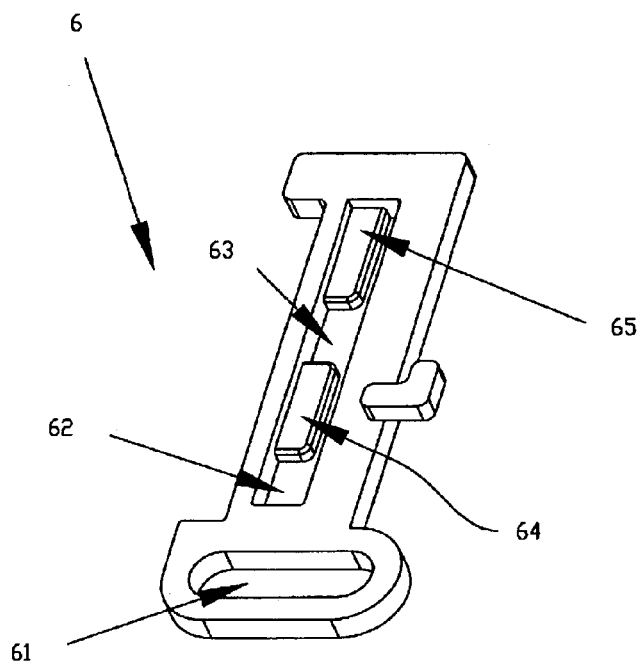
FIG. 6B is a perspective view of a sliding element of the optical disk device of FIG. 2.
Figure 6A:
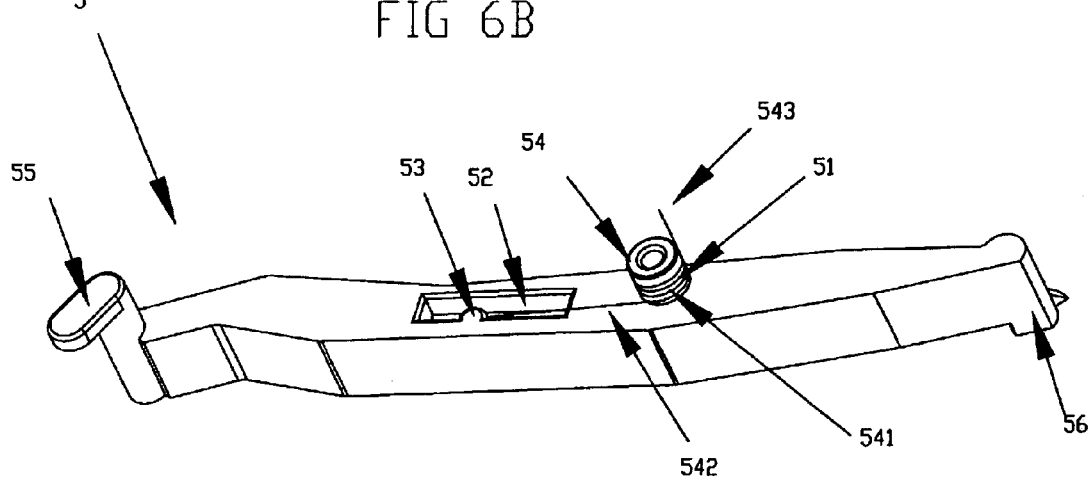
FIG. 6A is a perspective view of a trigger arm of the optical disk device of FIG. 2.

FIGS. 6A and 6B respectively illustrate the trigger arm 5 and the sliding element 6 of the disk-positioning device 8. Referring to FIG. 6A, the trigger arm 5 includes a pin 51 extending from its top surface and an extended groove 52 provided near the pin 51. A hook 53 is defined on the edge of the extended groove 52, and the pin 51 is adapted to extend through the rear curved guide groove 19. An elastic member 54 includes a main winding 541, a first end 542, and a second end 543. The main winding 541 is fitted to the pin 51, and the first end 542 and the second end 543 are respectively restrained by the hook 53 of trigger arm 5 and the guide pin 47 of the left positioning plate 4. The elastic member 54 may be a torsion spring, which may be fabricated from either metal or plastic. A left extension 55 is integrally formed with the trigger arm 5. The left extension 55 is not parallel with the trigger arm 5, and is positioned at one end of the trigger arm 5. As shown in FIG. 5B, the left positioning plate 4 also has a positioning hole 48 that is adapted to receive the pin 51 and the torsion spring 54. The left extension 55 extends through and travels within the rear guide groove 14. As shown in FIG. 6A, a right extension 56 is also provided at the other end of the trigger arm 5.

Further, referring to FIG. 6B, the sliding element 6 has a guide groove 61, a first opening 62, a second opening 63, a first protrusion 64, and a second protrusion 65. The left extension 55 of the trigger arm 5 is adapted to travel through the guide groove 61, and the rear restriction hooks 141, 142 are respectively adapted to travel through the second opening 63 and the first opening 62. Both the first protrusion 64 and the second protrusion 65 are integrally formed with the sliding element 6. The rear restriction hooks 141, 142 abut, and slide along, the second protrusion 65 and the first protrusion 64, respectively, during the insertion of ejection the optical disks. Thus, the sliding element 6 is slidably positioned on the substrate 1.

Figure 7:
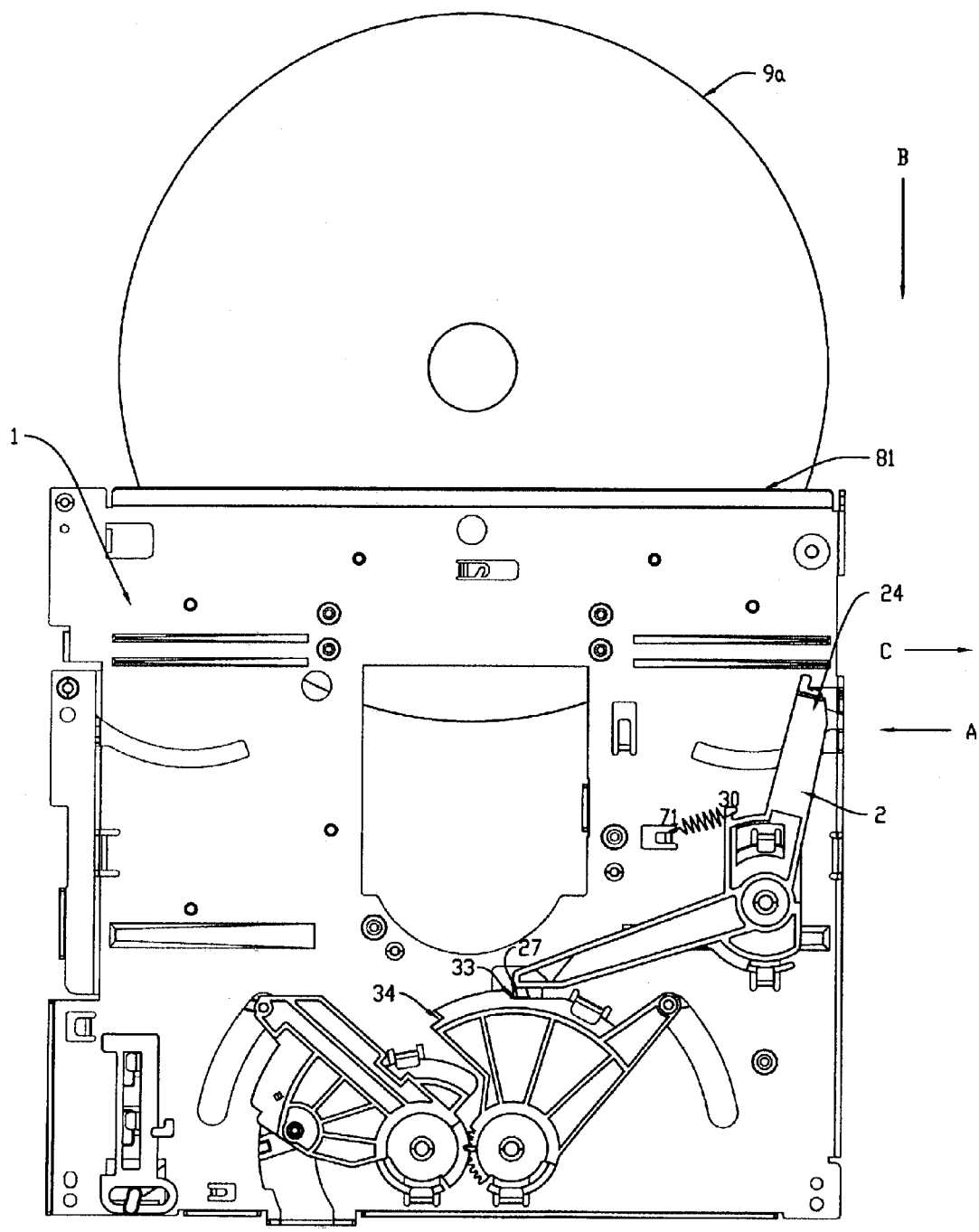
FIGS. 7–10 illustrate how a 12-cm optical disk can be inserted into the optical reading device of FIG. 2.
Figure 8:
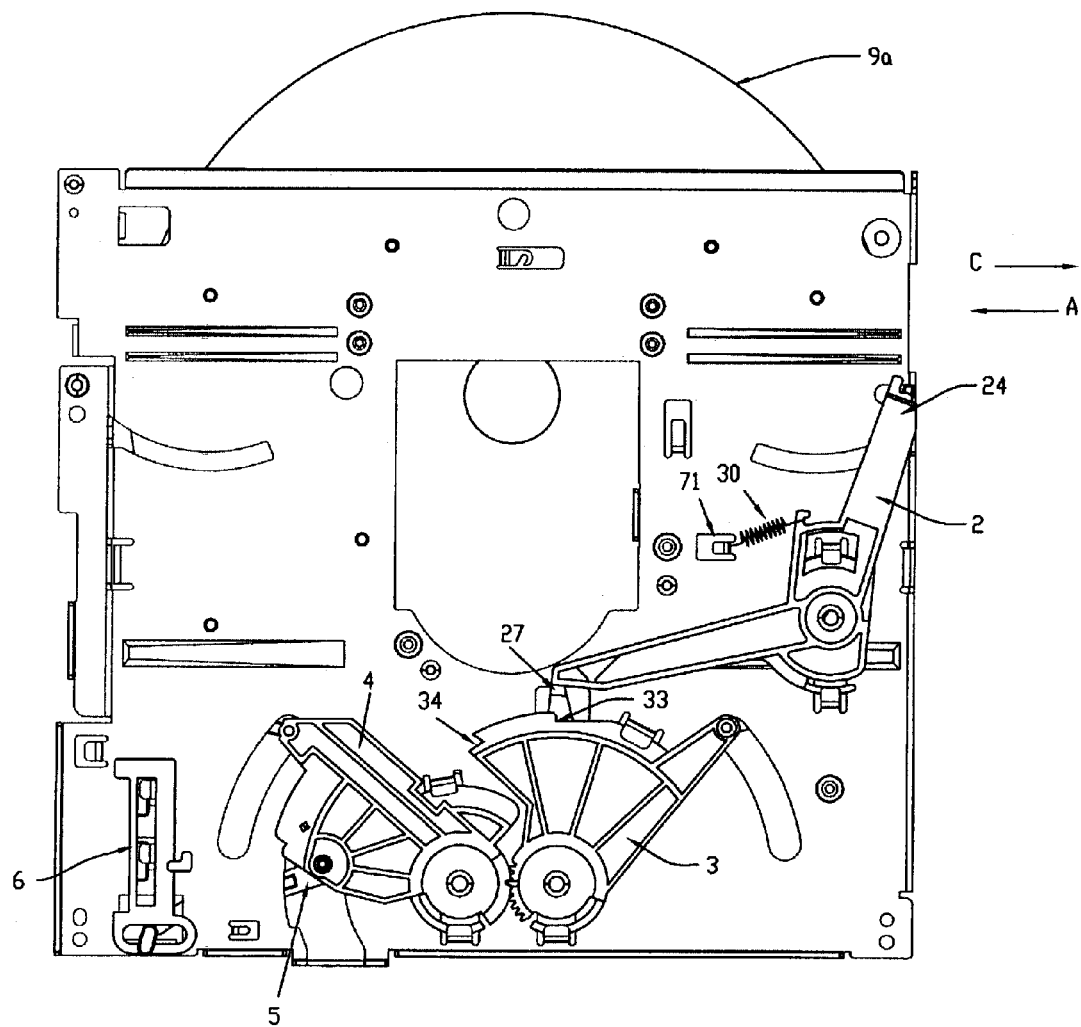

FIGS. 7 through 10 illustrate how a 12-cm disk 9a can be positioned inside the optical disk device of FIG. 2. Referring to FIG. 7, the optical disk 9 (12-cm disk) is inserted into the optical disk device in the direction of arrow B. The 12-cm disk 9a is pulled by a roller mechanism (not shown) near the front edge 81 and inserted into the optical disk device. Because the edge of the 12-cm disk 9a does not initially contact the locking rod guide pin 24, and the elastic member 30 pulls the locking rod 2 away from the right edge 82, the engagement between the locking pin 27 and the first notch 33 remains intact. Further, referring to FIG. 8, when the 12-cm disk 9a is inserted further, the 12-cm disk 9a contacts the locking rod guide pin 24 and pushes the locking rod guide pin 24 to travel along the guide groove 821 of the substrate 1. Thus, the 12-cm disk 9a pushes the locking rod 2 outwardly in the direction of arrow C of FIG. 8. The locking pin 27 of the locking rod 2 disengages from the first notch 33 of the right positioning plate 3. Because of the resilience of the elastic member 30, the locking rod guide pin 24 abuts, and slides along, the edge of the 12-cm disk 9a.

Figure 9:
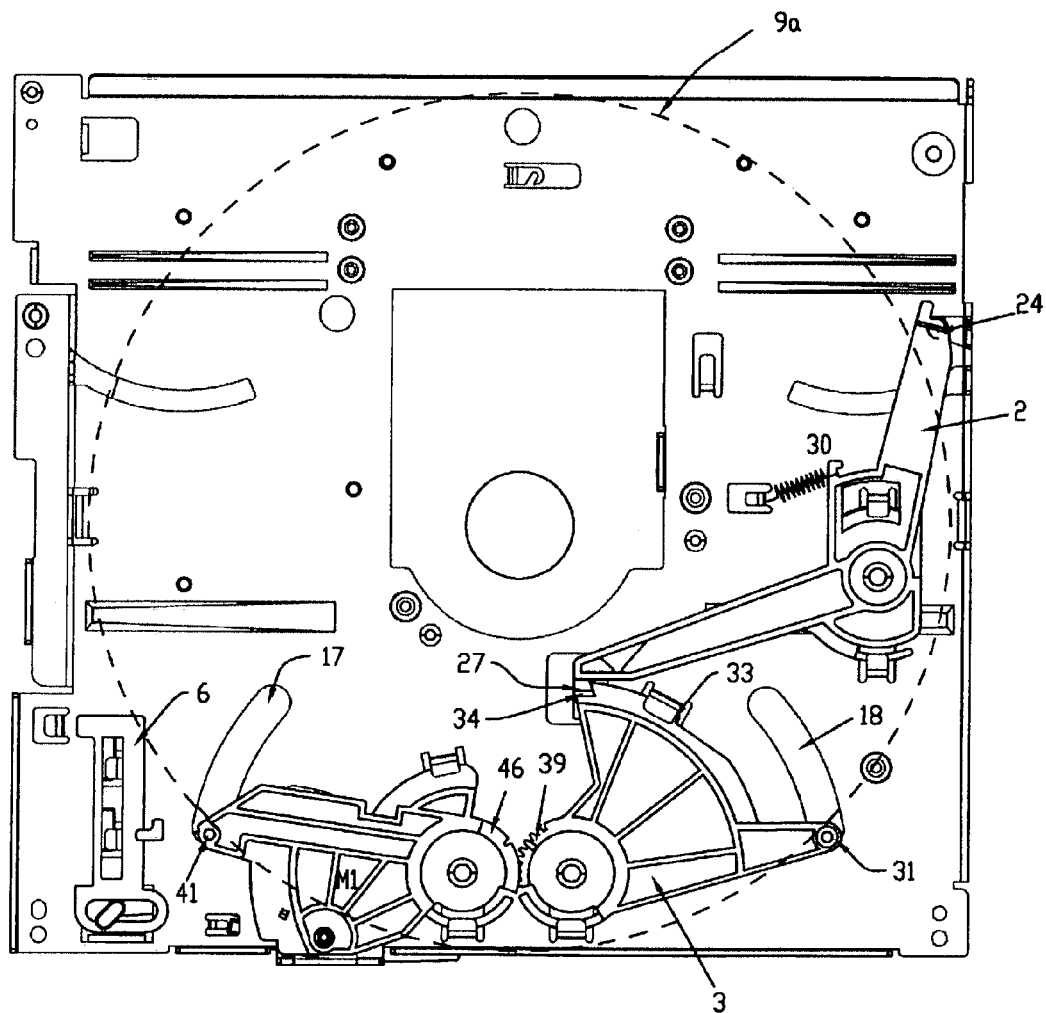
Figure 10:
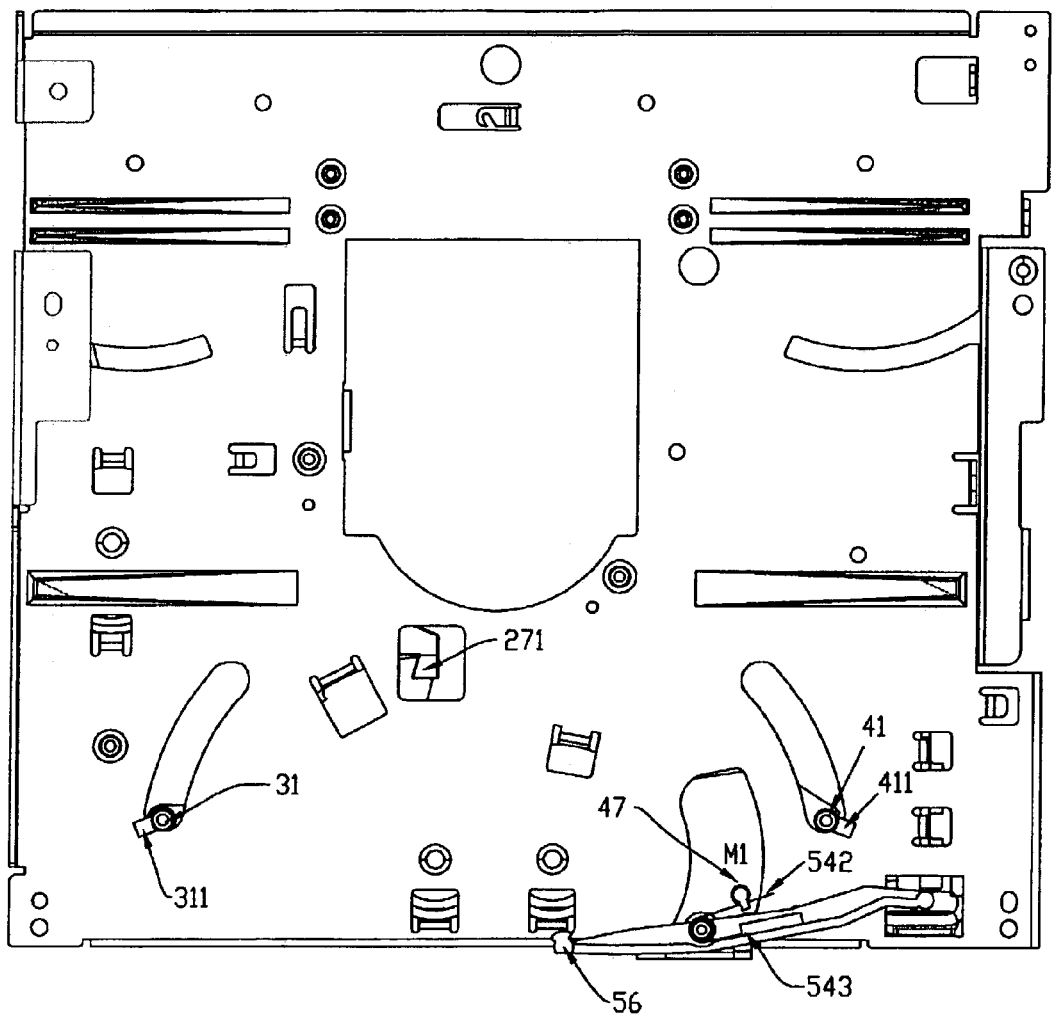

Referring to FIGS. 9 through 10, when the 12-cm disk 9a is inserted further, the edge of the 12-cm disk 9a contacts the right guide pin 31 of the right positioning plate 3 and the left guide pin 41 of the left positioning plate 4. The right guide pin 31 and the left guide pin 41 function to guide the 12-cm disk 9a during insertion of the 12-cm disk 9a. The spur gear 39 of the right positioning plate 3 engages with the gear rack 46 of the left positioning plate 4. The pin 51 of the trigger arm 5 is fitted to the positioning hole 48 of the left positioning plate 4. The left extension 55 of the trigger arm 5 passes through the rear guide groove 14 and travels through the guide groove 61 of the sliding element 6. The first end 542 and the second end 543 of the elastic member 54 are respectively restrained by the hook 53 of trigger arm 5 and the guide pin 47 of the left positioning plate 4. When the 12-cm disk 9a continues to move, the 12-cm disk 9a pushes the right positioning plate 3 and the left positioning plate 4 rearward, and the right guide pin 31 and the left guide pin 41 are forcibly opened further. In addition, the locking pin 27 of the locking rod 2 engages the second notch 34 of the right positioning plate 3 because the elastic member 30 functions to bias the locking pin 27 toward the central hole 7. When the left positioning plate 4 is pushed toward the rear edge 84 of the substrate 1, the elastic member 54 opposes a torsional moment M1 as shown in FIG. 9.

Referring to FIG. 10, until the right extension 56 of the trigger arm 5 contacts the rear edge 84 of the substrate 1, the trigger arm 5 is pivoted about the right extension 56 because of the resilience of the elastic member 54, thereby causing the sliding element 6 to move forward. The 12-cm disk 9a comes to stop and the subsequent process (reading or writing) begins.

During the ejection of 12-cm disk 9a, the 12-cm disk 9a is pulled out of the substrate 1 by a roller mechanism (not shown). When the 12-cm disk 9a is unloaded, the edge of the 12-cm disk 9a contacts the locking rod guide pin 24. Thereafter, the 12-cm disk 9a pushes the locking rod guide pin 24 outward in the direction of arrow C of FIG. 8 so that the locking pin 27 of the locking rod 2 disengages from the second notch 34 of the right positioning plate 3. Then, the right guide pin 31 and the left guide pin 41 abut and slide along the edge of 12-cm disk 9a because of the resilience of the elastic member 54. The right positioning plate 3 and the left positioning plate 4 pivot in the reverse direction of arrow B of FIG. 7. The 12-cm disk 9a leaves the optical disk device, and the right guide pin 31 and the left guide pin 41 respectively contact the original ends of the right guide groove 18 and the left guide groove 17. The locking rod 2, the right positioning plate 3, and the left positioning plate 4 return to the initial position because of the resilient force of the elastic member 30 and 54.

Figure 11:
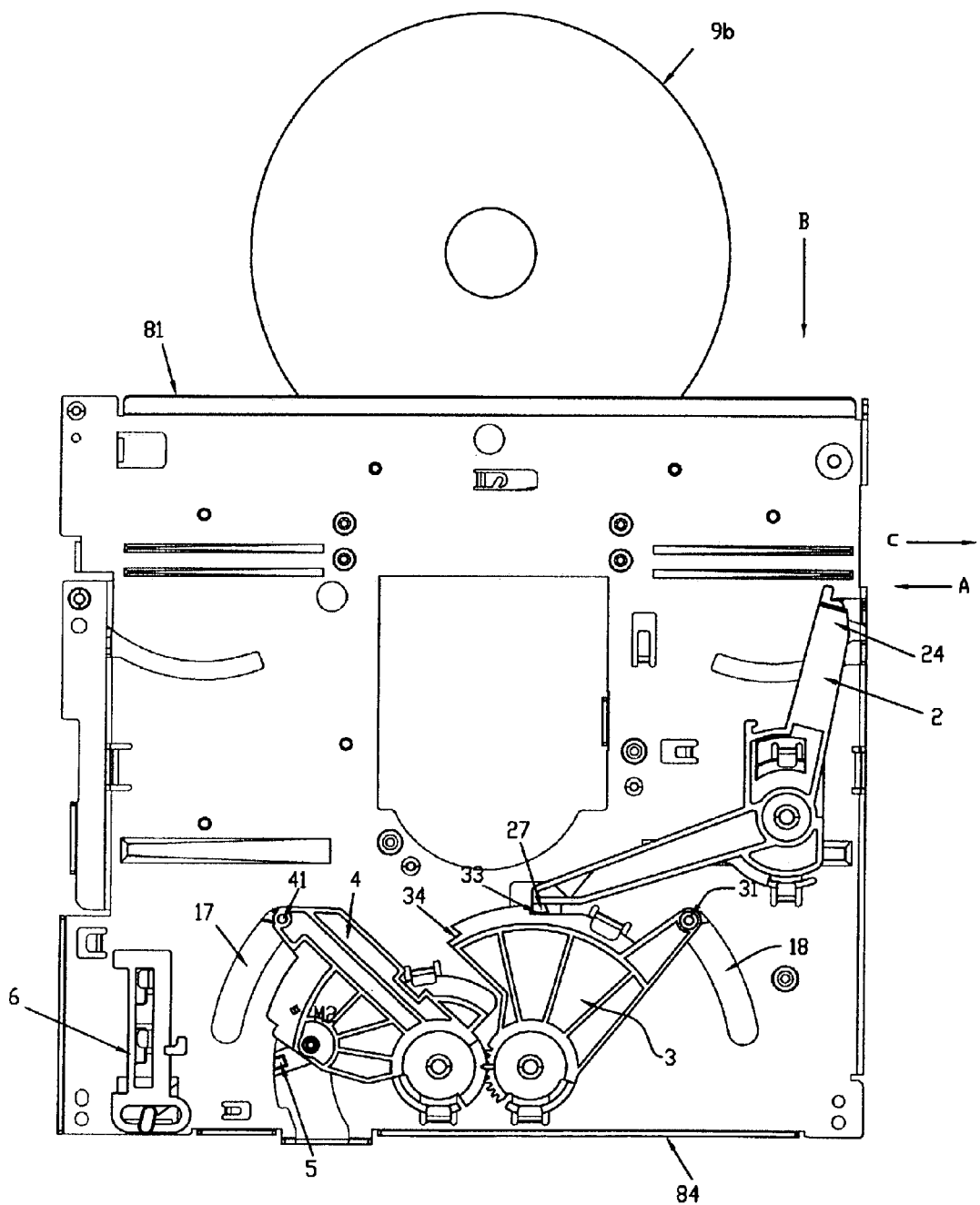
FIGS. 11–13 illustrate how an 8-cm optical disk can be inserted into the optical reading device of FIG. 2.
Figure 12:
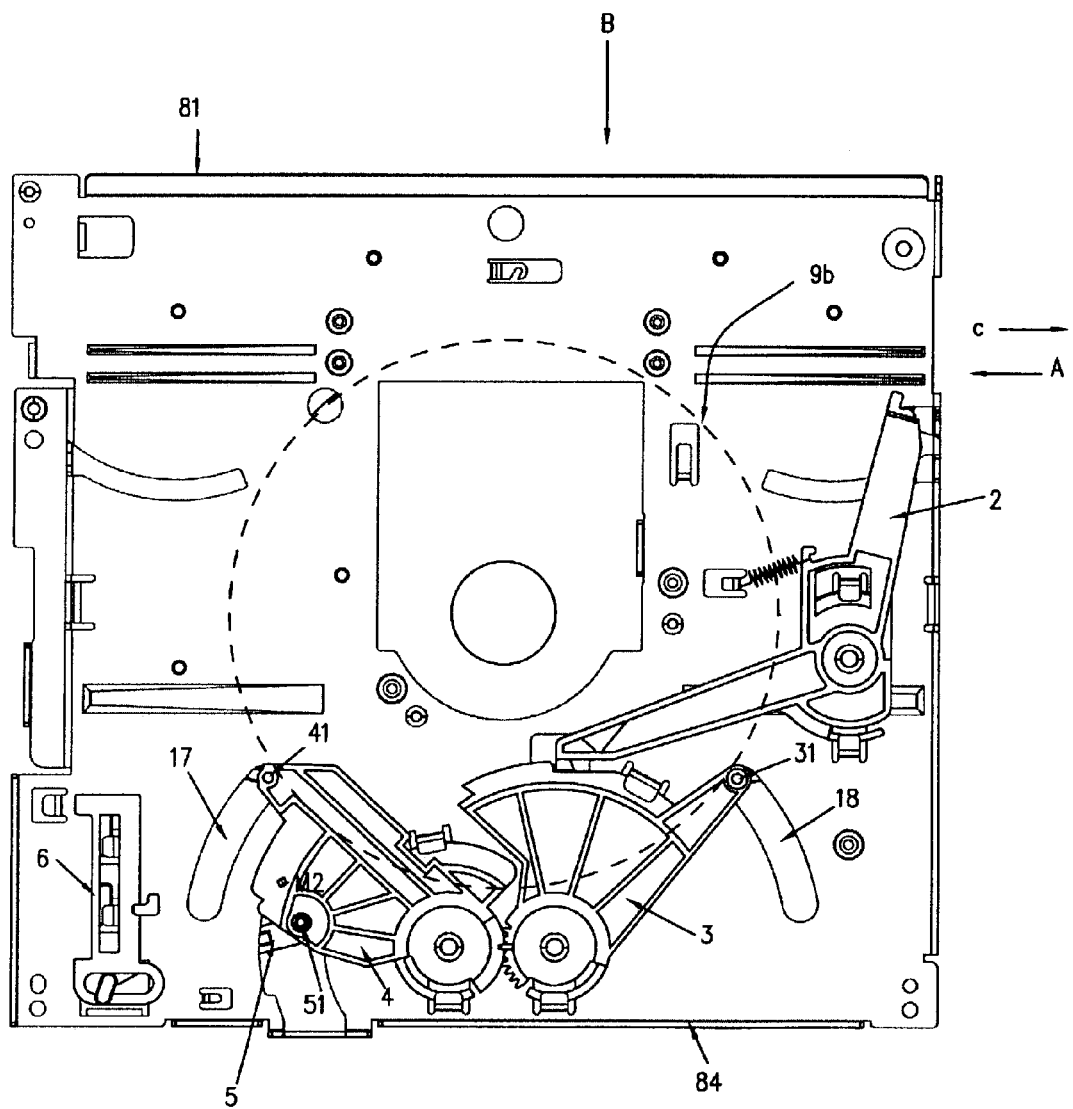
Figure 13:
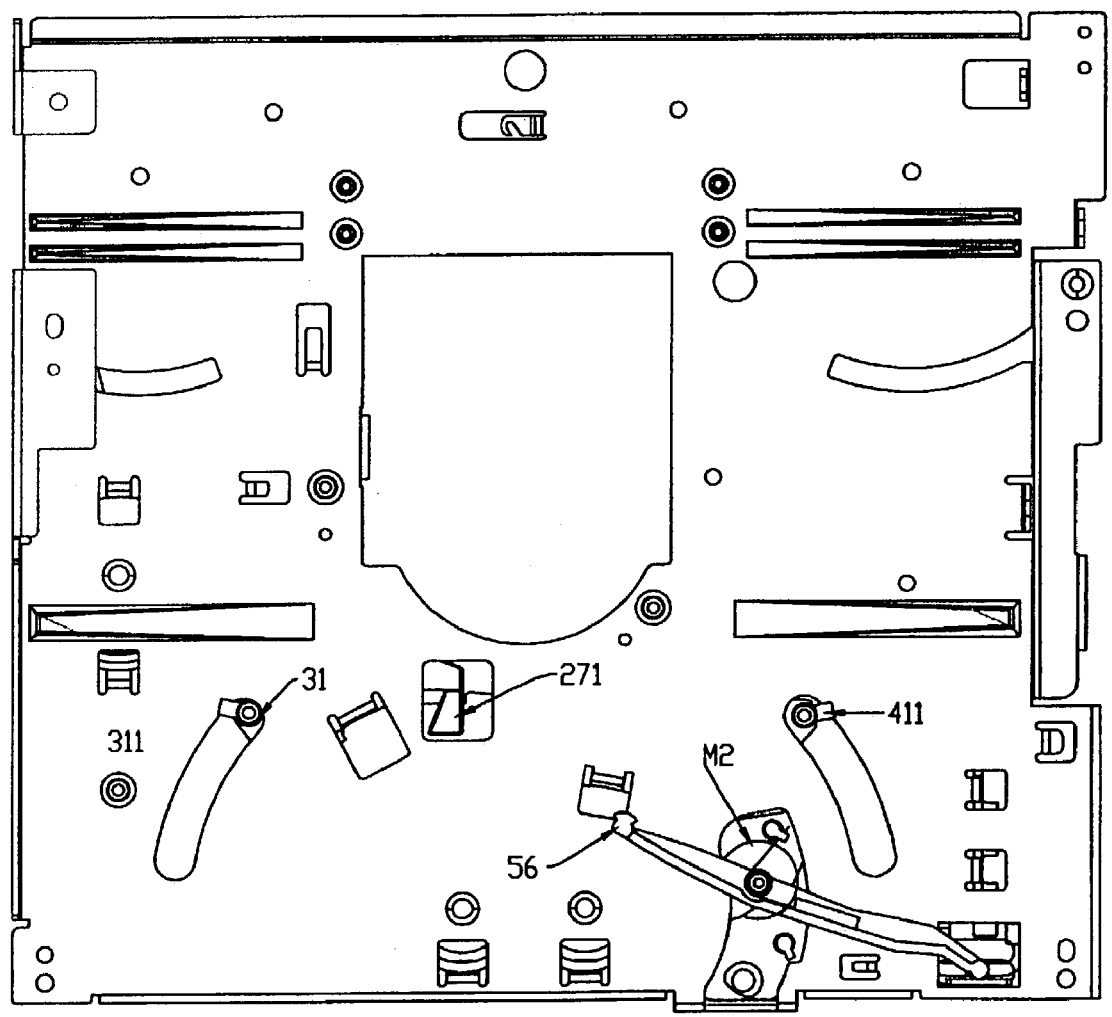

FIGS. 11 through 13 illustrate how an 8-cm disk 9b can be positioned inside the optical disk device of FIG. 2. Like the insertion of the 12-cm disk 9a, the 8-cm disk 9b is inserted into the optical disk device in the direction of arrow B of FIG. 11. When the 8-cm disk 9b is inserted into the optical disk device, the 8-cm disk 9b is pulled by a roller mechanism (not shown). Referring to FIG. 12, the smaller diameter of the 8-cm disk 9b prevents the 8-cm disk 9b from contacting the locking rod guide pin 24 and pushing the locking rod 2. Thus, the locking rod 2 and the right positioning plate 3 remains engaged because the locking pin 27 of the locking rod 2 engages with the first notch 33 of the right positioning plate 3. When the 8-cm disk 9b is inserted further, the edge of the 8-cm disk contacts the right guide pin 31 of the right positioning plate 3 and the left guide pin 41 of the left positioning plate 4. As the disk is being inserted farther, the 8-cm disk 9b pushes the right positioning plate 3 and the left positioning plate 4 rearward for a short distance along the right guide groove 18 and the left guide groove 17. As a result, the 8-cm disk 9b is automatically guided to the center of the optical disk device. As shown in FIGS. 12 and 13, a torsional moment M2 is produced so the trigger arm 5 is pivoted about the pin 51 because of the resilience of the elastic member 54. Thus, the sliding element 6 moves in the reverse direction of arrow B of FIG. 11 and toward the front edge 81 of the substrate 1. The 8-cm disk 9b comes to stop and the subsequent process (reading or writing) begins.

During ejection, the 8-cm disk 9b is pulled out of the substrate 1 by a roller mechanism (not shown). The ejection of 8-cm disk 9b is similar to the ejection of the 12-cm disk 9a as described above. Because the engagement between the locking rod 2 and the right positioning plate 3 remains intact, there is no relative motion among these components of the disk-positioning device 8 during ejection of the 8-cm disk 9b. Finally, the 8-cm disk 9b leaves the optical disk device.

The embodiments of the present invention utilize the right positioning plate 3 and the left positioning plate 4 to guide the positioning of both a 12-cm disk and an 8-cm disk into the optical disk drive. Because the positioning plate 3 and the left positioning plate 4 has the spur gear 39 and the gear rack 46, respectively, the right positioning plate 3 engages with the left positioning plate 4 to permit corresponding movement between the two plates 3, 4.

While the disclosed embodiments specifically teach a 12-cm disk and an 8-cm disk, it should be appreciated that the above-disclosed embodiments may be extended to accommodate disks of varying sizes.

Although exemplary embodiments have been shown and described, it will be clear to those of ordinary skill in the art that a number of changes, modifications, or alterations to the invention as described may be made. All such changes, modifications, and alterations should therefore be seen as within the scope of the disclosure.

What is claimed is:

1. A disk-positioning device for use in an optical disk device, the disk-positioning device comprising:
    a substrate having a plurality of guide grooves;
    a locking rod pivotally positioned on the substrate, the locking rod having a guide pin and a locking pin, the guide pin being adapted to extend through one of the guide grooves;
    a first positioning plate pivotally positioned on the substrate, the first positioning plate having a first notch and a spur gear, the first notch being configured to releasably engage the locking pin of the locking rod;
    a second positioning plate pivotally positioned on the substrate, the second positioning plate having a gear rack, the gear rack being configured to engage the spur gear of the first positioning plate; and
    an elastic member connected between the locking rod and the substrate, the elastic member being configured to bias the locking rod.

2. The disk-positioning device as claimed in claim 1, wherein the elastic member is a spring.

3. The disk-positioning device as claimed in claim 1, wherein the substrate comprises a pivot, wherein the locking rod is pivotally coupled to the pivot.

4. The disk-positioning device as claimed in claim 1, wherein the substrate comprises a pivot, wherein the first positioning plate is pivotally coupled to the pivot.

5. The disk-positioning device as claimed in claim 1, wherein the substrate comprises a pivot, wherein the second positioning plate is pivotally coupled to the pivot.

6. The disk-positioning device as claimed in claim 1, wherein the locking pin of the locking rod disengages from the first notch of the first positioning plate when a disk having a first size pushes the guide pin of the locking rod, wherein the locking pin of the locking rod remains engaged with the first notch of the first positioning plate when a disk having a second size smaller than the first size is inserted.

7. The disk-positioning device as claimed in claim 1, further comprising:
  a trigger arm that is operatively coupled to the second positioning plate; and
  a second notch that is positioned at the first positioning plate, wherein the locking pin of the locking rod is configured to releasably engage the second notch.

8. The disk-positioning device as claimed in claim 7, further comprising:
  a sliding element having a guide groove; and
  an extension of the trigger arm being adapted to extend through the guide groove.

9. A disk-positioning device for use in an optical disk device, the disk-positioning device comprising:
  a substrate having a plurality of guide grooves and pivots;
  a locking rod pivotally connected to one of the pivots, the locking rod having a guide pin and a locking pin, the guide pin being adapted to extend through one of the guide grooves;
  a first positioning plate pivotally connected to one of the pivots, the first positioning plate comprising a first notch, a second notch, and a spur gear, wherein the locking pin of the locking rod is configured to releasably engage the first notch when a disk of a first size is inserted, the locking pin of the locking rod is configured to releasably engage the second notch when a disk of a second size is inserted;
  a second positioning plate pivotally connected to one of the pivots, the second positioning plate having a gear rack and a positioning hole, wherein the spur gear of the first positioning plate is adapted to engage with the gear rack;
  a trigger arm having a pin, the pin being operatively coupled to the positioning hole of the second positioning plate; and
  an elastic member connected between the locking rod and the substrate, the elastic member being configured to bias the locking rod.

10. The disk-positioning device as claimed in claim 9:
  wherein the substrate has a hook;
  wherein the locking rod has an element hook; and
  wherein the elastic member is connected between the hook and the element hook to bias the locking rod.

11. The disk-positioning device as claimed in claim 9, wherein the elastic member is a spring.

12. The disk-positioning device as claimed in claim 10, further comprising:
  a first guide pin positioned on the first positioning plate; and
  a second guide pin positioned on the second positioning plate.

13. The disk-positioning device as claimed in claim 10, further comprising:
  a left projection extending from the left positioning plate; and
  a right projection extending from the right positioning plate.

14. The disk-positioning device as claimed in claim 12:
  wherein the first guide pin is configured to contact the edge of a disk during its insertion or ejection; and
  wherein the second guide pin is configured to contact the edge of a disk during its insertion or ejection.

15. The disk-positioning device as claimed in claim 13:
  wherein the left projection of the left positioning plate is configured to abut a bottom surface of the substrate when a disk is inserted and ejected;
  wherein the left projection of the left positioning plate is configured to slide along the bottom surface of the substrate when a disk is inserted and ejected;
  wherein the right projection of the right positioning plate is configured to abut a bottom surface of the substrate when a disk is inserted and ejected; and
  wherein the right projection of the right positioning plate is configured to slide along the bottom surface of the substrate when a disk is inserted and ejected.

* * * * *